Oct. 26, 1943.   C. W. MOTT   2,332,739
POWER ARRANGEMENT FOR AGRICULTURAL IMPLEMENTS
Filed Aug. 17, 1940   4 Sheets-Sheet 1
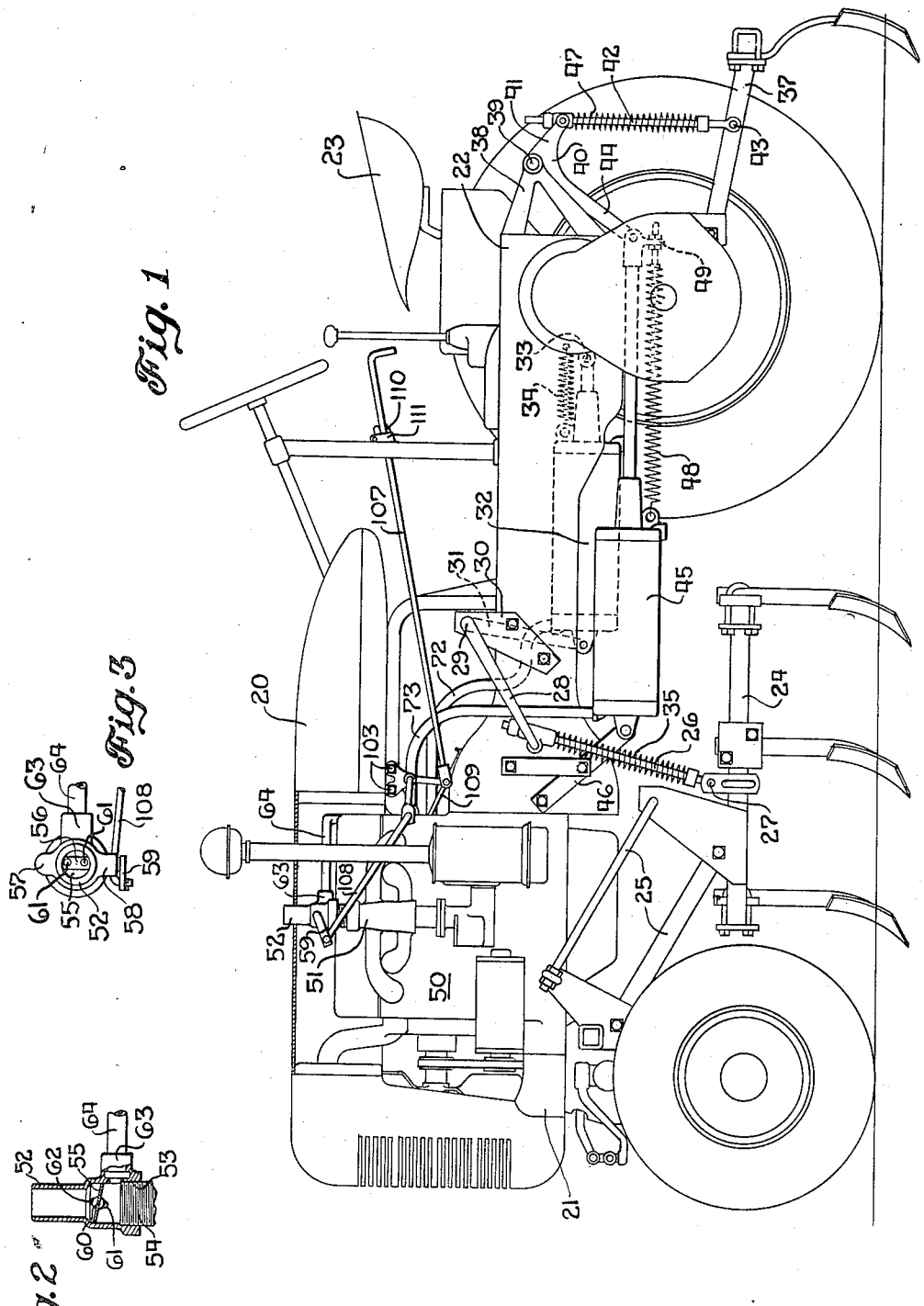
Inventor
Carl W. Mott
By Paul Rippel
Att'y.

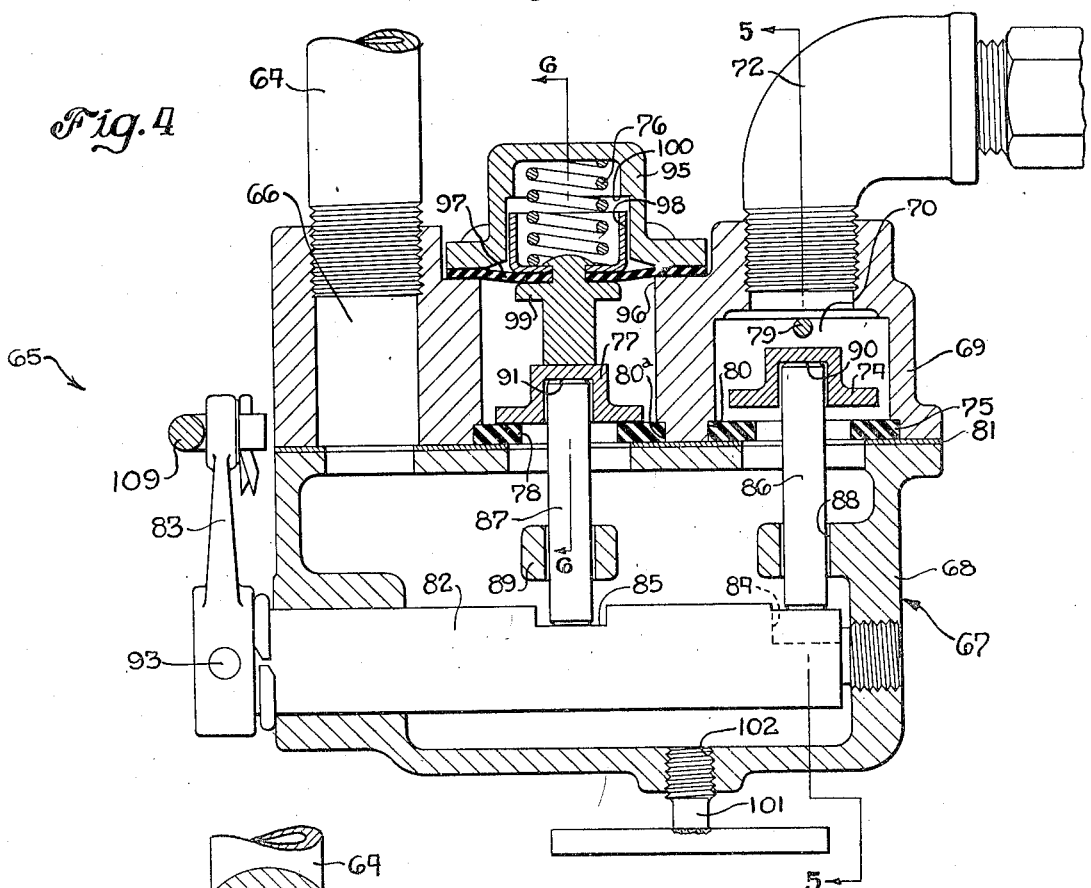
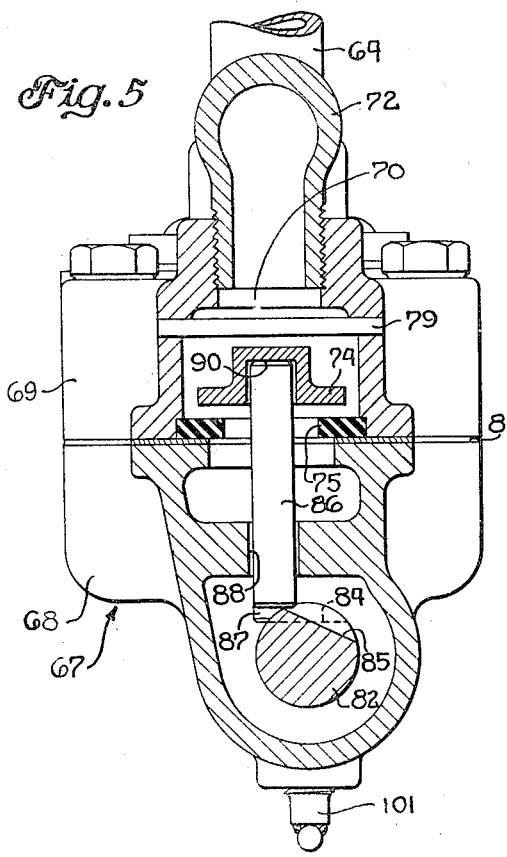
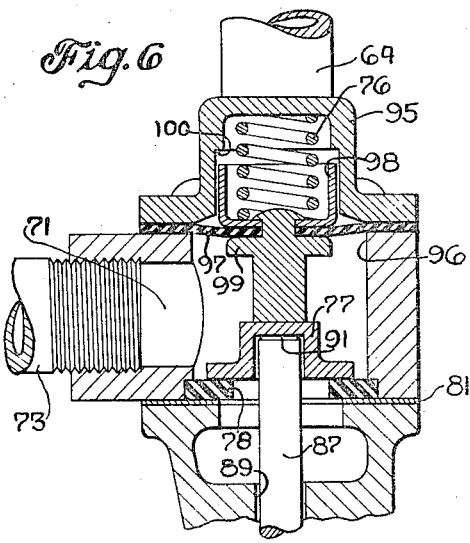

Oct. 26, 1943.     C. W. MOTT     2,332,739
POWER ARRANGEMENT FOR AGRICULTURAL IMPLEMENTS
Filed Aug. 17, 1940     4 Sheets-Sheet 3

Inventor
Carl W. Mott
By Paul O. Pippel
Atty.

Oct. 26, 1943.   C. W. MOTT   2,332,739
POWER ARRANGEMENT FOR AGRICULTURAL IMPLEMENTS
Filed Aug. 17, 1940   4 Sheets-Sheet 4
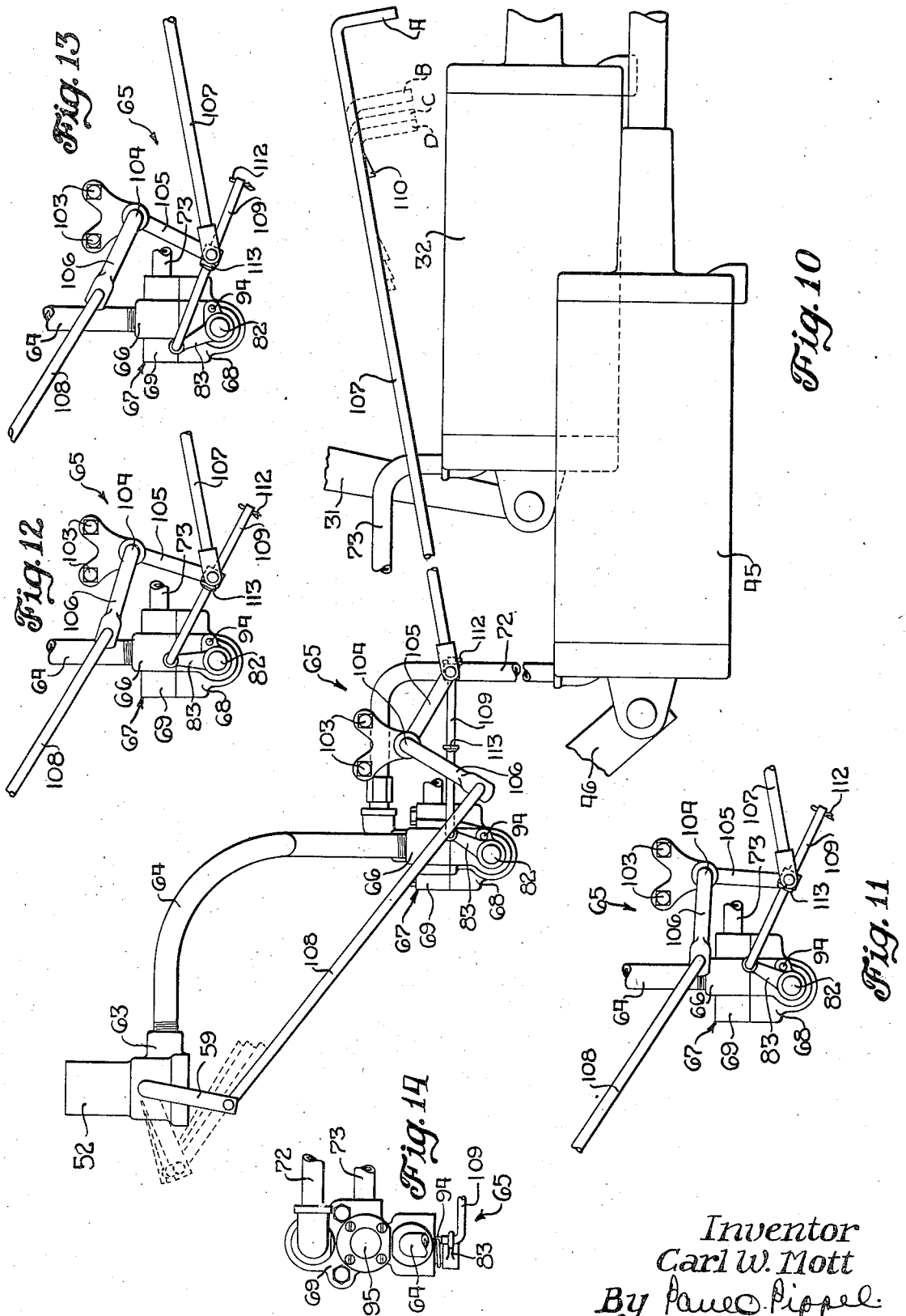
Inventor
Carl W. Mott
By Paul O. Pippel
Att'y.

Patented Oct. 26, 1943

2,332,739

UNITED STATES PATENT OFFICE 2,332,739

POWER ARRANGEMENT FOR AGRICULTURAL IMPLEMENTS

Carl W. Mott, La Grange, Ill., assignor to International Harvester Company, a corporation of New Jersey Application August 17, 1940, Serial No. 353,099

16 Claims. (Cl. 97—50)

This invention relates to power arrangements for moving parts of implements from one position to another, and particularly to an arrangement wherein utilization is made of the exhaust gases of an internal combustion engine for the moving energy necessary for actuating fluid actuating devices forming a part of the arrangement.

In such arrangements as used heretofore, the energy has been supplied by a device separate from the engine used for driving the same, for instance, with the usual hydraulic fluid actuating power arrangements it has been necessary to provide a fluid pump and reservoir housing in addition to the usual controlling means and fluid actuating devices. This fluid pump necessarily had to be provided with means for its connection with some moving part actuated by the internal combustion engine for the receiving of mechanical power in order to effect driving of the same. The cost for providing these pumping arrangements added considerably to the entire cost of the entire power arrangement.

It is, therefore, an object of the present invention to provide a power arrangement wherein fluid energy may be taken directly from the internal combustion engine to thereby eliminate the necessity of providing with power arrangements a pumping mechanism and its accompanying reservoir and to thereby provide a power arrangement which is cheaper to construct than the power arrangements provided heretofore.

It is another object of the invention to provide a valve control mechanism of a type particularly adapted for the control of exhaust gases wherein fluid may be caused to pass to fluid actuating devices in a successive order to thereby cause successive movement of implement parts connected to their supporting frame for independent movement.

It is still another object of the invention to provide a manual means accessible from the operator's station on the tractor which means is common to both valve means for diverting the flow of exhaust gases to the fluid actuating devices and to the means for releasing the trap valves for effecting a lowering or return movement of the implement part to its working position.

According to the present invention, there has been provided a power arrangement wherein power is taken directly from the exhaust outlet of an internal combustion engine of the tractor. Located in the exhaust outlet is a valve for cutting off the normal flow of exhaust gas being dissipated to the atmosphere from the internal combustion engine to cause the same to be diverted through a passage means to a control mechanism where the same is distributed to cylinder devices connected respectively with implement parts, which are, in turn, connected for movement to a supporting frame such as that of the tractor, or to that of any implement of a type adapted to be pulled behind a tractor. The control mechanism has at least one valve adapted to be retained in its closed position by a spring biasing means. This valve prevents the early flow of fluid to the particular fluid cylinder device which it controls. After the fluid has flowed to the other of the fluid devices, such as the fluid device associated with an implement located on the forward portion of the tractor, the pressure biasing valve is opened due to the increased fluid pressure thereon so that the fluid actuating device which it controls on the rear portion of the tractor is then actuated. In order to effect return movement of the implements to their working position, these respective valves are manually opened. The diverting valve means in the exhaust outlet and the means for opening the valves are controlled by a single manual means accessible to the operator's station on the rear portion of the tractor. After the implements have been moved such as by a lifting movement, the manual operating means is returned to a neutral position wherein the diverting butterfly valve in the exhaust outlet is opened to continue the flow of exhaust gases to the atmosphere.

For other objects and for a better understanding of the invention, reference may be had to the following detailed description taken in connection with the accompanying drawings, in which:

Figure 1 is an elevational view of a tractor having implements connected thereto and with the power arrangement of the present invention connected with the implements in order that movement of the same may be effected;

Figures 2 and 3 are detailed views of a part including a butterfly diverting valve and adapted for attachment to the ordinary exhaust outlet means and forming a part thereof for the taking off of the exhaust gases upon the valve being closed;

Figure 7:
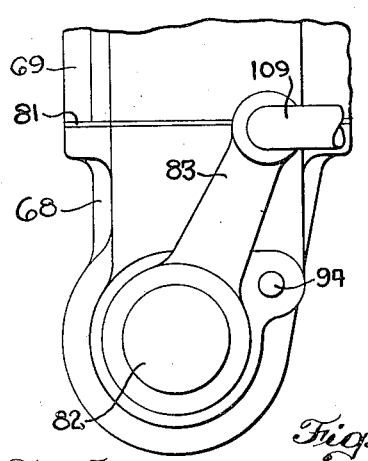

Figures 4, 5, and 6 are sectional views of the control means adapted for receiving the fluid gases and for the distribution of the same to the fluid actuating devices, the views being in actual size of the device which is used, with Figure 5 being taken along the line 5—5 of Figure 4, while Figure 6 is taken along the lines 6—6 of Figure 4, and showing the biasing delayed lift valve;

Figures 7, 7a, 7b, 8, 8a, 8b, 9, 9a, and 9b are detail sectional views of the control mechanism illustrating particularly the sequence of operation of the respective valve opening means to effect lowering of the implements to their working position in sequential order;

Figure 10 is a view in elevation of the power arrangement and showing the manual operating means common with both the diverting butterfly valve and the fluid control means and the arrangement being in a position with the butterfly valve closed;

Figures 11, 12, and 13 are views similar to a portion of Figure 10 illustrating the position of the lowering means when in a neutral position, when in a position with the forward implement lowered and when in a position with the final or rearward implement lowered, and corresponding respectively with the positions of certain parts indicated partially in dotted lines in Figure 10; and Figure 14 is a top plan view of the control valve mechanism and its connected parts.

Referring now particularly to Figure 1, there is shown a tractor or motor-propelled vehicle 20 having a forward portion 21 and a rearward portion 22 on which is located an operator's station 23. Connected to the forward portion 21 of the tractor is an implement rig 24 and there may be two of these rigs located at either the same side of the tractor or one at one side and one at the other side thereof. This rig may be connected in any manner, as by the use of parallel links 25, to permit vertical movement of the same to and from its ground-working position. As a means for lifting this forward rig there is provided a lifting rod 26 connected thereto at its lower end as indicated at 27 and at its upper end to a lifting lever 28 pivotable at 29 in a bracket means 30 which is in turn fastened to the tractor. On the other side of the tractor there may also be located a similar arm 28 for connection with an implement located on the other side of the tractor. The lifting arms are tied together to thereby provide a rockable element adapted to be actuated by an arm 31 extending downwardly and having connected thereto a fluid actuating device 32 which in turn is connected to the tractor as indicated at 33 to react thereagainst to thereby effect rocking of the rockable element and consequent lifting of the implement rigs on the sides of the tractor. For holding the implement 24 in its ground-working position there may be provided a spring means 34 connected to the tractor and to the fluid actuating cylinder device 32, the cylinder device being so connected in the arrangement that as its outer or cylinder part moves forwardly upon the device being actuated its inner piston member remains stationary. The spring means 34 thereby fixes the position of the arm 28 so that the usual pressure spring 35 may react thereagainst to maintain the individual implement rig in its ground-working position.

On the rear portion 22 of the tractor is connected a rear implement 37 adapted for vertical movement to and from its ground-working position. Also there is provided a bracket structure 38 adapted to support a rock-shaft 39 which may extend across the rear of the tractor and to which is fixed a bell crank 40 having a rearwardly extending arm 41 for connection with a lift rod 42 that is in turn pivotally connected as indicated at 43 to the rear implement rig 37.

For an implement rig located on the opposite side of the tractor there also may be provided a second lifting arm 41, which may be similarly connected to the implement rig by means of a lift rod 42. The bell crank 40 also has a downwardly extending arm 44 for connection with a fluid cylinder device 45, which is adapted to actuate the rock-shaft 39 to thereby effect lifting of the rear rigs. This fluid cylinder device 45 is anchored to the forward portion of the tractor by means of a bracket structure 46 and will react thereagainst so that the piston rod will be projected from the cylinder part of the device to actuate the rock-shaft 39. It will thus be noted that the cylinder device 45 differs from the fluid device 32 only in that the movable part for the device 45 is that of the piston part, whereas the movable part of the fluid device 42 is that of the cylinder part. The lift rod 42 for the rear rig may include a usual pressure spring 47 and it may be made effective by the use of a spring device 48 tending always to collapse the cylinder device 45. This spring device 48 is connected between the cylinder part of the fluid device 45 and the arm 44 as indicated at 49. While these cylinder devices 32 and 45 are of the single acting type it will be apparent that the effect of a double acting type of cylinder device will be had by the use of the respective spring means 34 and 48.

The tractor 20 also includes an internal combustion engine 50 having the usual exhaust gas outlet means 51 adapted to receive the gases during the exhaust cycle of the engine for the purpose of normally dissipating them to the atmosphere. Associated with this gas outlet means 51 there may be provided a casting 52 as shown more clearly in the Figures 2 and 3, which may have a threaded portion 53 for engagement with a threaded portion 54. This casting 52 contains a butterfly valve 55, which when turned in a counterclockwise direction as viewed in Figure 2, serves to close the gas outlet means of the engine. This butterfly valve 55 is actuated by a laterally extending shaft 56 journaled in bearing portions 57 and 58 formed in a part of the casting 52. This shaft 56 has an actuating arm 59 for thereby effecting actuation of the valve 55. The valve 55 may take the form of a plate which may be fitted to the shaft 56 by the provision in the shaft of a slotted opening 60 extending diametrically therethrough when receiving the valve and having openings 61 in the shaft disposed at an angle with respect to the slotted opening 60 for the receiving of cotter pins 62 which will extend through the opening 61 and through an opening in the valve plate, whereby the valve plate will be made rigid with the shaft 56. The casting 52 also has a hollow boss 63 to which is connected a passage pipe 64 serving as a fluid communication from the exhaust outlet of the internal combustion engine. This portion 63 includes an opening through the side wall of the casting 52 and is so located with respect to the valve 55 that upon closing of the valve 55 the exhaust gases will be diverted into the same and into the fluid communication means or pipe 64. The pipe 64 serving as a fluid communication means may be of such length that the same may be extended over the engine 50 rearwardly and downwardly for connection with the valve control means 65 as illustrated more clearly in Figure 10. This pipe 64, in addition to being of considerable length, is of metal and of such size that the hot exhaust gases normally entering the same will be substantially cooled and condensed upon leaving the same and entering the fluid control means 65.

Referring now particularly to Figures 4, 5, and 6, there will be viewed the internal construction of the fluid control means 65. The fluid gases received through the pipe 64 will enter the fluid control means through an opening in its inlet portion 66. This connection of the pipe may be made by threading of the pipe into a threaded portion forming part of the portion 66 of the fluid control means 65. Generally the fluid control means 65 includes a housing 67 adapted for receiving the fluid gases and constructed in two parts; a lower part 68 and an upper part 69. The part 69 contains two outlet portions 70 and 71 through which the fluid gases may be directed to the fluid actuating devices by means of fluid communication means or pipes 72 and 73 respectively threadedly connected with the outlet portions 70 and 71. These passage means 72 and 73 are connected with the fluid actuating devices 32 and 45 respectively. The fluid upon entering the housing 67 will immediately flow through the opening 70 to the actuating device 32 thereby to effect lifting movement of the forward implement rig 24, its valve 74 being maintained on its valve seat 75 only by means of gravity. The fluid tending to flow to the fluid device 45 is delayed in its movement until the fluid device 32 for the lifting of the forward part or implement rig 34 has become completely actuated so that sufficient fluid pressure may be built up within the housing 67 to overcome a spring biasing means 76 tending to retain valve 77 on a valve seat 78. The purpose of this spring device means 76 is to automatically effect delayed operation of the implement rig on the rear portion of the tractor, so that, when the tractor with the accompanying implement rigs arrives at the end of the field being cultivated, the forward rigs will at first be lifted and then the rear implement rigs will be lifted at a later time when they have finally come to the end of the field and thus full cultivation of the implement rigs on the rear portion of the tractor will be obtained. While the valve 77 is retained on its valve seat by the spring means 76, the valve 74 is prevented in its further movement after the same has moved some distance by a stop member 79 extending diagonally across the opening 70.

The part 69 is fashioned to provide two recess portions 80 and 80a for receiving respectively valve seats 75 and 78 which may be made of rubber and taking the form of a washer. When the parts 68 and 69 are fixed together with a gasket 81 therebetween, these valve seats 75 and 78 will be retained in their recesses 80 and 80a in rigid relation with the housing 67. The lower part 68 contains a cam shaft 82 adapted to be operated by an arm 83 on a portion thereof extending laterally to a location outside the housing 67. This cam shaft has faces 84 and 85 against which abut vertically projected pins 86 and 87 respectively. These pins are held against lateral movement by passing through the openings 88 and 89 respectively formed within portions of the lower part 68 of the housing 67. The valves 74 are so fashioned as to provide recesses 90 and 91 within the same to receive the upper ends of the vertically extending rods 86 and 87. It will thus be apparent that the valves 74 and 77 will likewise be steadied against lateral displacement because the pins 86 and 87 oven which the valves fit are in turn steadied against lateral displacement.

Figure 7A:
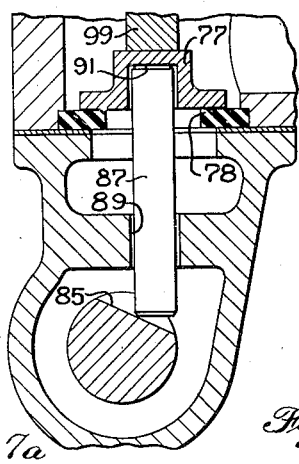
Figure 7B:
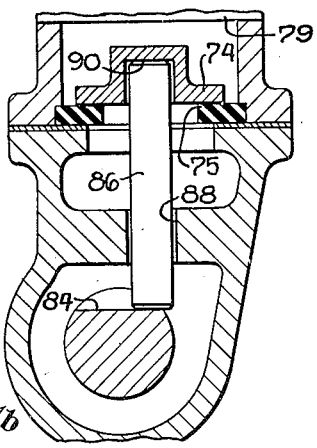

Referring now more particularly to Figures 7, 7a, 7b, 8, 8a, 8b, 9, 9a, and 9b, where there is illustrated the relative positions of the valves with respect to the camming surfaces 84 and 85, when the arm 83 is located in the position shown in Figures 7, 7a, and 7b, both of the valves 74 and 77 are in their closed position, and the pins are located in their lowermost position with respect thereto on their cam surfaces 84 and 85. It will be noted that the cam surface 84 as viewed in Figure 7b is substantially horizontal, whereas the cam surface 85, as viewed in Figure 7a, is at an angle with respect to the horizontal and to the cam surface 84. The cam surfaces remain in this angular relation since they are formed within the continuous shaft 82 to which the arm 83 is rigidly connected by means of a threaded screw 93. In order to prevent further clockwise movement of the arm 83 with respect to the housing 67, there is provided a pin 94 extending laterally so that the same may be engaged by the arm 83.

Figure 8:
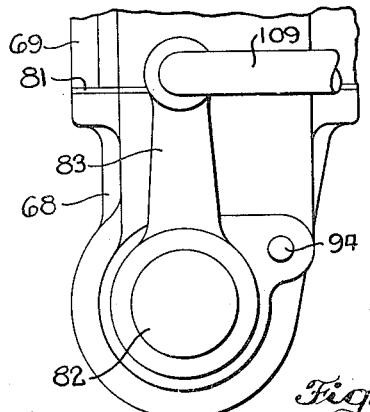
Figure 8A:
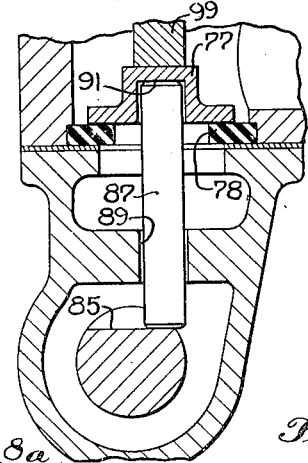
Figure 8B:
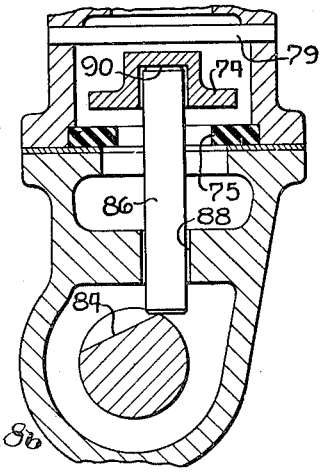

Referring now to Figures 8, 8a, and 8b, the arm 83 has been rotated to a position so that it is substantially vertical whereby the pin 86 has been projected into the opening 70 to lift the valve 74 off of its seat 75. The lifting of the valve 74 off the seat is done against the fluid pressure within the fluid actuating device 32. Once the valve is open, the fluid from the cylinder device 32 will be exhausted to thereby permit lowering of the implement rig 24 on the forward portion of the tractor, all the while the pin 87 has remained in its same position and its cooperating valve 77 has remained on the valve seat 78.

Figure 9:
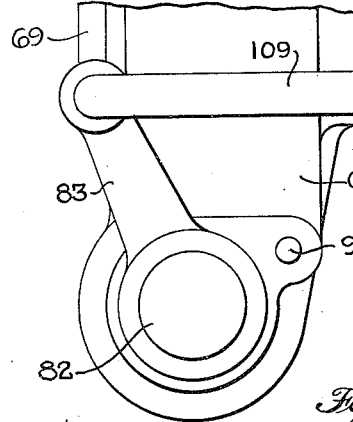
Figure 9A:
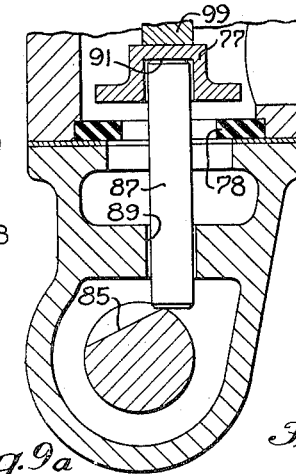
Figure 9B:
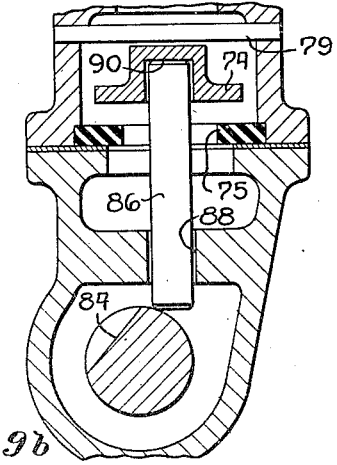

When the arm 83 has been moved to the position shown in Figure 9, the valve 77 will be moved to its open position. This valve 77 has been held closed by the spring biasing means 76 and as well by fluid within the fluid actuating device 45. Upon opening of this valve 77 it will be apparent that the implement rig 37 on the rear portion of the tractor will be lowered to its working position. The spring biasing means 76 may be fixed to the upper part 69 of the housing 67 by the nesting of the same within a recess formed within the cover part 95 adapted to close an open portion 96. In order to prevent leakage through the connection of the cover part 95 with the open portion 96, there has been provided a flexible sealing means 97. This flexible sealing means 97 takes the form of a washer made of flexible material such as rubber and to which there is attached a cup member 98 into which the spring means 76 may extend, and engaging part 99 adapted to bear against the upper face of the valve 77. The cup part 98 is fitted within the recess formed in the cover plate 95 and will engage with an abutment 100 within the recess. When the cup member 98 engages the abutment 100 the vertical movement of the valve 77 is stopped.

In the lower portion of the member 68 formed in the housing 67 there is provided a drain plug 101, upon the removal of which fluid may flow through an opening 102. During the operation of the arrangement, there is some condensation of the gases and it is desirable that this condensation may be removed from the housing 67 at times when the arrangement is to stand in cold weather, in order to prevent any damage to the housing resulting from freezing of the same.

Referring now to Figures 10, 11, 12, and 13, there is shown more in detail the manual means common to both the butterfly valve in the gas outlet means of the engine and to the arm 83 for operating the cam shaft 82 to effect successive emission of fluid from the fluid devices 32 and 45, this fluid having returned through the control means 65 back into the pipe 64 and to the atmosphere through the casting 52 serving as a part of the gas outlet means. Fixed to the tractor as indicated at 103 is a bracket for supporting a rotatable means 104 having arms 105 and 106. This rotatable means has connected to its arm 105 a rearwardly extending rod 107, while connected to the arm 106 is a forwardly extending rod 108, which is in turn connected at its upper end to the arm 59 for actuation of the butterfly valve 55. The arm 83 of the cam means 82 is likewise connected to the arm 105 by means of a link 109.

When it is desired to effect lifting of the implements, the rod 107 is pulled rearwardly to the furthermost extent to a position as shown in full at A in Figure 10. The rod 107 has a downwardly extending projection 110 adapted to be hooked over a portion 111 on the tractor as shown in Figure 1 so that the rod will be retained against forward movement when the implement rigs are in their working position. The rearward movement of the rod 107 causes a counterclockwise rotation of the rotatable means 104 and likewise a counterclockwise movement of the valve 55 to thereby close the same and at the same time cause clockwise movement of the arm 83 so that it may abut the pin 94. The implements will then be lifted in successive order in the manner heretofore described, the fluid first passing to the actuating device 32 and then after a predetermined pressure has been reached to operate valve 27, the fluid is passed to the fluid actuating device 45.

After both implements have been raised the rod 107 will be moved forwardly to the position B so that the projection 110 thereon will bear against portion 111 to prevent further forward movement of the rod and so as to effect opening of the butterfly valve 55. Since the connection of the link 109 with the arm 105 is such as to provide a lost motion when the arm 105 initially moves in a clockwise direction, the arm 83 will not be actuated upon movement of the rod from the position A to the position B. The cotter pin 112 serves to cause rearward movement of the link 109 during the rearward pull of the rod 107, while a stop 113 is located thereon so that the lost motion between the link 109 and the arm 105 may be taken up. The tractor will now travel along with the implements in their raised position.

When it is desired to lower the forward implement, the rod 107 is moved to a position C, the arm 105 in turn acting against the stop member 113 to move the arm 83 and the rod 109 to the position shown in Figure 12. In this position the valve 74 will have been opened as viewed in Figures 8, 8a, and 8b. This is accomplished by unlatching the element 110 from the catch 111 and moving the rod 107 forwardly thereover.

After the tractor has traveled a distance so that the rear implement rig on the rear portion of the tractor has entered the field, the rod 107 may be moved to a position D so that the arm 83 will take the position shown in Figures 9 and 13 and so that the valve 77 will be opened. It will thus be apparent that in addition to providing means for effecting automatic successive movement of the forward and rearward implements upon raising of the rigs, that means has been provided as well for effecting successive lowering of the forward implements. It will also be apparent that the valve means for diverting of the fluid from the exhaust outlet and the means for effecting successive lowering of the implements has associated with them a means which is common to both and which may be manually operated from the operator's station 23. This manually operable means is found in the rod 107, the rotatable means 104, and the rod 108.

It should now be apparent that there has been provided a power arrangement whereby use of the exhaust fluid gases from an internal combustion engine which may form a part of a propelling tractor for implements can be utilized to effect movement of implement parts associated with the tractor. It should also be apparent that this movement of implement parts can be made successively, both as to their movement in one direction and as to their movement in the return direction. Also, it will be noted that the usual parts serving to generate fluid in the power arrangements heretofore have been eliminated and that fluid energy may be taken directly from the internal combustion engine rather than through a mechanical connection and pump means otherwise to provide this energy, all of which has served materially to reduce the cost of the manufacture of power arrangements for the effecting of movement of various implement parts commonly associated with a tractor or with some tool-carrying frame.

While various changes may be made in the detail arrangement of the various parts which form the subject-matter of the present invention, it shall be understood that such changes shall be made within the spirit and scope of the present invention as defined by the appended claims.

What is claimed is:

1. In combination, a tool-supporting frame having a working tool adapted to be moved to and from its working position, means for propelling said frame including an internal combustion engine having an exhaust outlet for the escape of the burned gases during the exhaust part of the cycle of the engine, a power arrangement including means receiving the burned exhaust gases to be actuated by the same and adapted to react against said frame for effecting movement of the tool with respect to its working position, trap valve means through which the gases are directable into said gas-receiving means and normally conditioned to prevent the flow of such gas therethrough in the opposite direction and to thus retain the gases in said gas-receiving means, said trap valve means being manipulatable to permit the flow of gas therethrough in said opposite direction, and means for so conditioning said trap valve means to permit removal of gases from the receiving means and for return movement of the working tool.

2. In combination, a tool-supporting vehicle, a working tool connected to the vehicle for movement to and from its working position, an internal combustion engine associated with the vehicle and having an exhaust outlet for the escape of burned gases during the exhaust part of the cycle of the same, power means adapted to receive the burned gases for the purpose of being actuated by the same, said power means being connected to the working tool and to the vehicle to react against the latter for the purpose of moving the tool, trap valve means through which the gases are directable into said gas-receiving means and normally conditioned to prevent the flow of such gas therethrough in the opposite direction and to thus retain the gases in said gas-receiving means, said trap valve means being manipulatable to permit the flow of gas therethrough in said opposite direction, and means for so conditioning said trap valve means to permit removal of gases from the receiving means and for return movement of the working tool.

3. In combination, an implement having a part adapted for movement from one position to another position, a tractor for propelling the implement having an internal combustion engine with an exhaust outlet means for normally dissipating the gases to the atmosphere, and power means for moving said part including a fluid expansible device in fluid communication with said exhaust outlet means, and means for closing the exhaust outlet means to divert the flow of gases into the fluid communication to effect expansion of the fluid expansible device to move the implement part, said exhaust outlet closing means being also openable from the closed condition to allow escape of exhaust gases through the exhaust outlet, trap valve means for retaining the diverted gases in said device but being openable to cause the escape of such gases from the device, and means for sequentially opening said exhaust outlet closing means and said trap valve means to permit removal of the gases from the fluid expansible device for return movement of the implement part at a desired time subsequent to the opening of the exhaust outlet closing means.

4. In combination, an implement having a part adapted for movement from one position to another position, a tractor for propelling the implement having an internal combustion engine with an exhaust outlet means for normally dissipating exhaust gases to the atmosphere, power means for moving the implement part including a fluid expansible device, fluid communication means manipulatable between an inactive condition in which no substantial interference is had thereby with said dissipation of the exhaust gases to a diverting condition for diverting exhaust gases under pressure into the fluid expansible device to cause actuation of the same, a trap valve in the fluid communication means for retaining the gases in the fluid expansible device, and means for sequentially manipulating said fluid communication means and opening the trap valve to cause the gases in the fluid device to be delivered to the atmosphere by way of the fluid communication and the exhaust outlet means of the engine at a desired time after manipulation of the fluid communication means into the inactive condition.

5. In combination, an implement having a part adapted for movement from one position to another position, a tractor for propelling the implement having an internal combustion engine with an exhaust outlet means for normally dissipating exhaust gases to the atmosphere, power means for moving the implement part including a fluid expansible device, fluid communication means between the exhaust outlet means and the fluid expansible device, means for closing the exhaust outlet means to the atmosphere to divert the flow of gases into the fluid communication means, valve means in the fluid communication means for controlling the return flow of the gases from the fluid expansible device, manual means common to both the exhaust closing means and the said valve means to thereby control by a common control means the flow of gases entering and leaving the fluid expansible device.

6. In combination, a tractor, implements mounted on the tractor for independent movement to and from their working positions, an internal combustion engine forming a part of the tractor, and having an exhaust outlet means for normally dissipating exhaust gases thereof to the atmosphere, a fluid arrangement adapted to receive exhaust gases from the exhaust outlet means and including a fluid actuating device for each of the implements to respectively effect movement of the same upon being actuated, means for diverting the flow of exhaust gases into the fluid actuating devices, and means for delaying the flow of gases to at least one of the fluid actuating devices whereby successive movement of the implements may be effected.

7. In combination, a tractor, implements mounted on the tractor for independent movement to and from their working positions, an internal combustion engine forming a part of the tractor, and having an exhaust outlet means for normally dissipating exhaust gases thereof to the atmosphere, a fluid arrangement adapted to receive exhaust gases from the exhaust outlet means and including a fluid actuating device for each of the implements to respectively effect movement of the same upon being actuated, means for diverting the flow of exhaust gases into the fluid actuating devices, and means for delaying the flow of gases to at least one of the fluid actuating devices, and means for successively emitting the fluid from the respective fluid actuating devices whereby successive movement of the implements both to and from their working positions may be effected.

8. In combination, a tractor, implements mounted on the tractor for independent movement to and from their working positions, an internal combustion engine forming a part of the tractor, and having an exhaust outlet means for normally dissipating exhaust gases thereof to the atmosphere, a fluid arrangement adapted to receive exhaust gases from the exhaust outlet means and including a fluid actuating device for each of the implements to respectively effect movement of the same upon being actuated, means for diverting the flow of exhaust gases into the fluid actuating devices, and means for delaying the flow of gases to at least one of the fluid actuating devices, and manually operable means common to both the diverting means and successive emitting means for effecting sequential operation of the same.

9. In combination, an implement having parts adapted for independent movement between two positions, a tractor for propelling the implement having an internal combustion engine with outlet means for the exhaust gases thereof, a fluid arrangement adapted to receive the exhaust gases and including a fluid actuating device for each of the parts to respectively effect movement of the same upon being actuated, and means for delaying the flow of gases to at least one of the fluid actuating devices whereby successive movement of the respective parts will be effected.

10. In combination, an implement having parts adapted for independent movement between two positions, a tractor for propelling the implement having an internal combustion engine with outlet means for the exhaust gases thereof, a fluid arrangement adapted to receive the exhaust gases and including a fluid actuating device for each of the parts to respectively effect movement of the same upon being actuated, and means for delaying the flow of gases to at least one of the fluid actuating devices, and means for successively emitting the fluid from the respective fluid actuating devices, whereby successive movement of the parts between their two positions in both the movement in one direction and in the return direction may be effected.

11. In combination, an implement having parts adapted for independent movement from one position to another position, a tractor for propelling the implement having an internal combustion engine with an exhaust outlet means for normally dissipating exhaust gases thereof to the atmosphere, a fluid arrangement adapted to receive the exhaust gases and including a fluid actuating device for each of the parts to respectively effect movement of the same upon being actuated, valve means for diverting the normal flow of exhaust gases into the fluid actuating devices, means for delaying the flow of gases to at least one of the fluid actuating devices to effect successive movement of the parts from the one position to another position, means for successively emitting the fluid from the respective fluid actuating devices to effect successive return movement of the parts from the another position to the one position, and manual operable means common to both the diverting means and successive emitting means for effecting sequential operation of the same.

12. In combination, a tractor having forward and rearward portions, ground-working implements connected respectively to the forward and rearward portions for vertical movement to and from their ground-working positions, an internal combustion engine forming a part of the tractor and having an exhaust outlet means, means for successively moving the implements on the forward and rearward portions of the tractor including fluid actuating devices respectively connected to each of the implements, and control means for receiving and delivering the exhaust fluid from the exhaust outlet means to the fluid actuating devices in successive order.

13. In combination, an implement having a part adapted for movement from one position to another position, a tractor for propelling the implement having an internal combustion engine with an exhaust outlet means for normally dissipating the gases to the atmosphere, and power means for moving said part including a fluid expansible device in fluid communication with said exhaust outlet means, and means for closing the exhaust outlet means to divert the flow of gases into the fluid communication to effect expansion of the fluid expansible device to move the implement part, means operable automatically for retaining the implement part in its moved position independently of the fluid being communicated to the fluid expansible device, and means for releasing the retaining means to effect return movement of the implement part.

14. In combination, an implement having a part adapted for movement from one position to another position, a tractor for propelling the implement having an internal combustion engine with an exhaust outlet means for normally dissipating the gases to the atmosphere, and power means for moving said part including a fluid expansible device in fluid communication with said exhaust outlet means, and means for closing the exhaust outlet means to divert the flow of gases into the fluid communication to effect expansion of the fluid expansible device to move the implement part, valve means automatically operable for trapping the gases in said fluid expansible device to thereby retain the implement part in its moved position, and means for releasing the gases in the fluid expansible device to effect collapsing of the same and return movement of the implement part.

15. In combination, an implement having a part adapted for movement from one position to another position, a tractor for propelling the implement having an internal combustion engine with exhaust outlet means, power means for moving the implement part including a fluid expansible device in communication with the exhaust outlet means to be expanded by the exhaust gases from the same, means automatically operable and utilizing the gases that expand said device for retaining the implement part in its moved position independently of the fluid being communicated from the exhaust outlet means to the fluid expansible device, and means for releasing the retaining means to effect return movement of the implement part.

16. In combination, an implement having a part adapted for movement from one position to another position, a tractor for propelling the implement having an internal combustion engine with exhaust outlet means, power means for moving the implement part including a fluid expansible device in communication with the exhaust outlet means to be expanded by the exhaust gases from the same, trap valve means automatically operable for retaining the gases in said device to hold the implement part in its moved position, and means for opening said trap valve means to permit removal of the gases from the fluid expansible device to thereby effect return movement of the implement part.

CARL W. MOTT.